(12) United States Patent
Yen

(10) Patent No.: US 8,212,384 B2
(45) Date of Patent: Jul. 3, 2012

(54) PORTABLE ELECTRIC ENERGY SUPPLYING DEVICE

(76) Inventor: Jen Yen Yen, Changhua Hsien (TW)

( * ) Notice: Subject to any disclaimer, the term of this patent is extended or adjusted under 35 U.S.C. 154(b) by 378 days.

(21) Appl. No.: 12/583,906

(22) Filed: Aug. 27, 2009

(65) Prior Publication Data
US 2011/0049979 A1    Mar. 3, 2011

(51) Int. Cl.
*B60L 1/00*    (2006.01)
(52) U.S. Cl. ........................................... 307/10.1
(58) Field of Classification Search ................. 307/10.1; 320/109
See application file for complete search history.

(56) References Cited

U.S. PATENT DOCUMENTS

| 6,212,054 | B1 | 4/2001 | Chan |
| 6,215,273 | B1 | 4/2001 | Shy |
| 6,262,492 | B1 | 7/2001 | Sheng |
| 6,531,789 | B1 | 3/2003 | Chang |
| 6,565,381 | B1 | 5/2003 | Chou |

*Primary Examiner* — Hal Kaplan

(57) ABSTRACT

An electric energy supplying device includes a set-up circuit coupled to an electric energy source, a limited current circuit and a voltage regulator coupled to the set-up circuit, a battery coupled to the set-up circuit with a charge electrocircuit for being charged by the electric energy the charge electrocircuit, another set-up circuit is coupled to the battery for receiving the electric energy from the battery and includes an output device for coupling and supplying the DC electric energy to a failed or weak or not charged battery of a vehicle, and an inverter circuit is coupled to the battery and includes an output device for coupling and supplying the AC electric energy to charge various electric facilities.

5 Claims, 2 Drawing Sheets

PORTABLE ELECTRIC ENERGY SUPPLYING DEVICE

BACKGROUND OF THE INVENTION

1. Field of the Invention

The present invention relates to a portable electric energy supplying device or portable booster battery device, and more particularly to a portable electric energy supplying device for providing and supplying a direct current (DC) output to easily jump or boost the vehicle and for providing an alternative current (AC) output to energize various kinds of electric facilities.

2. Description of the Prior Art

Typical electric energy supplying devices or portable booster battery devices comprise a battery booster pack having a pre-charged battery for electrically coupling to a vehicle that has a weak battery, with a battery booster cable and for supplying the electric energy to the weak battery of the vehicle and for being used to jump-start the vehicle.

For example, U.S. Pat. No. 6,212,054 to Chan discloses one of the typical spark proof booster cable systems that is polarity sensitive and can detect proper and improper connections before providing path for electric current, and that is also provided to jump-start the vehicle.

However, the typical spark proof booster cable systems should be coupled to the weak battery of the vehicle in order to jump-start the vehicle. In addition, the typical spark proof booster cable systems may only supply the DC electric energy to jump-start the vehicle, but may not be used to supply the AC electric energy and to energize the other electric facilities.

U.S. Pat. No. 6,215,273 to Shy and U.S. Pat. No. 6,565,381 to Chou disclose the other typical portable electric energy sources each including two clips coupled to an inner pre-charged battery for coupling to the weak battery of the vehicle in order to jump-start the vehicle.

However, similarly, the typical portable electric energy sources should also be coupled to the weak battery of the vehicle in order to jump-start the vehicle. In addition, the typical portable electric energy source may only supply the DC electric energy to jump-start the vehicle, but may not be used to supply the AC electric energy and to energize the other electric facilities.

U.S. Pat. No. 6,262,492 to Sheng, and U.S. Pat. No. 6,531,789 to Chang disclose two further typical portable electric energy sources or car battery jumper cables each including an inner pre-charged battery, and two booster clamps coupled to the inner pre-charged battery and coupled to a failed or weak or not charged battery of the vehicle in order to supply the electric energy to jump-start the vehicle.

However, similarly, the typical portable electric energy sources should also be coupled to the weak battery of the vehicle in order to jump-start the vehicle. In addition, the typical portable electric energy source may only supply the DC electric energy to jump-start the vehicle, but may not be used to supply the AC electric energy and to energize the other electric facilities.

The present invention has arisen to mitigate and/or obviate the afore-described disadvantages of the conventional portable electric energy supplying devices.

SUMMARY OF THE INVENTION

The primary objective of the present invention is to provide a portable electric energy supplying device provided for providing and supplying a direct current (DC) output to easily jump or boost the vehicle and for providing an alternative current (AC) output to energize various kinds of electric facilities.

In accordance with one aspect of the invention, there is provided an electric energy supplying device comprising an input terminal, a first set-up circuit coupled to the input terminal for receiving an electric energy from the input terminal, a limited current circuit and a voltage regulator coupled to the input terminal and coupled to the first set-up circuit respectively, a battery coupled to the set-up circuit with a charge electrocircuit for receiving the electric energy from the first set-up circuit and the charge electrocircuit, a second set-up circuit coupled to the battery for receiving the electric energy from the battery, and including an output device for coupling and supplying the DC electric energy to a failed or weak or not charged battery of a vehicle in order to jump-start the vehicle, and an inverter circuit coupled to the battery for receiving the electric energy from the battery, and including an output device for coupling and supplying the AC electric energy to charge various electric facility.

The first set-up circuit includes an inductor coupled to a processor device for forming a resonant set-up circuit, and a first diode and a capacitor coupled to the processor device for rectifying and filtering the electric energy.

The limited current circuit includes a second diode and a resistor coupled in series to the processor device, and the second diode is coupled to the processor device directly for generating a voltage difference.

The voltage regulator includes two resistors coupled to the processor device for stabilizing a current generated by the set-up circuit.

The second set-up circuit includes an inductor coupled to a processor device for forming a resonant set-up circuit, and a diode and a capacitor coupled to the processor device for rectifying and filtering the electric energy.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
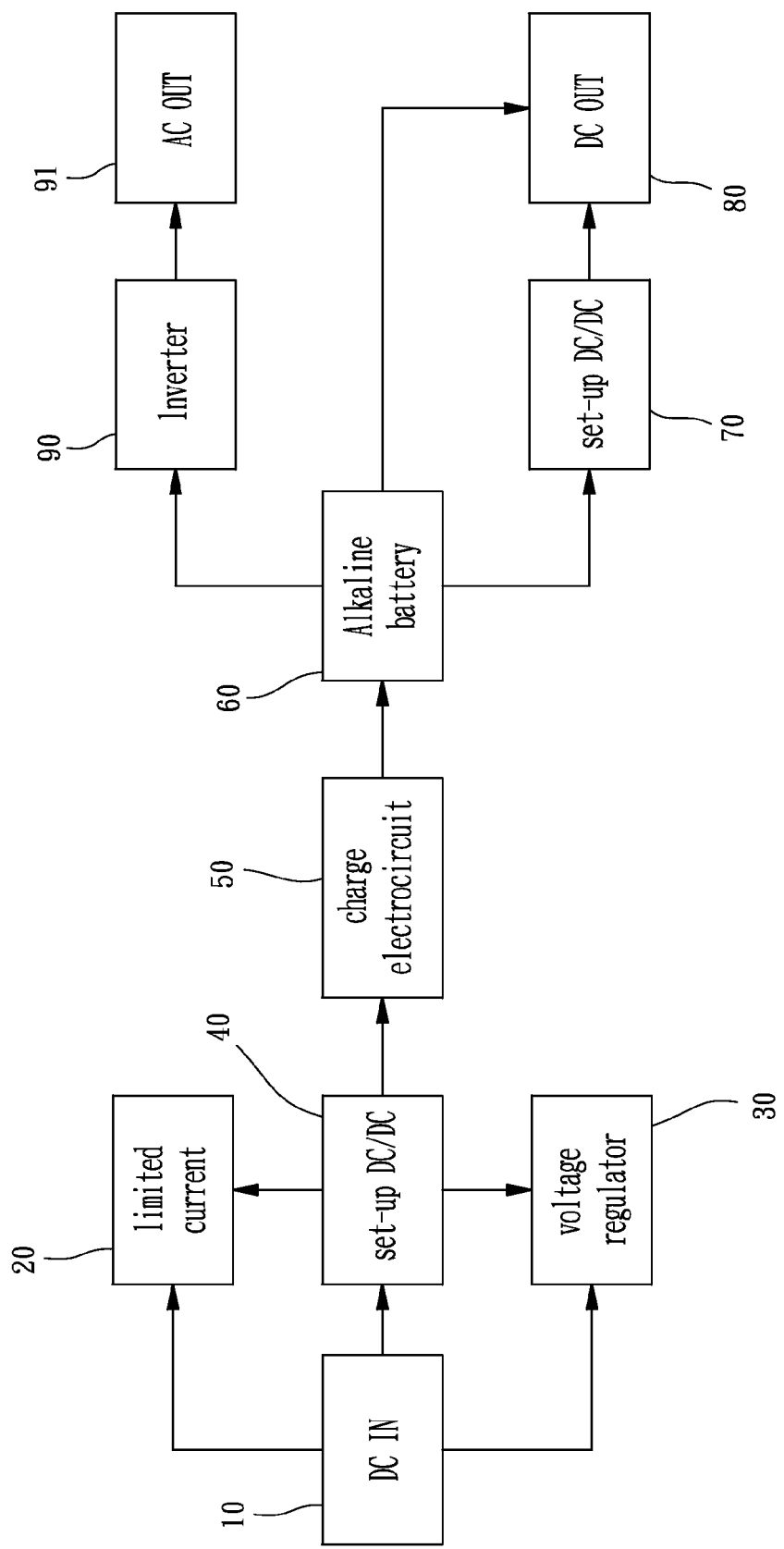
FIG. 1 is a block diagram illustrating the parts or elements of a portable electric energy supplying device in accordance with the present invention.

Referring to the drawings, and initially to FIG. 1, a portable electric energy supplying device in accordance with the present invention comprises a plug or coupler or adapter or input terminal 10 for coupling to an electric energy source, such as the cigarette igniter sockets of the vehicles (not shown), various AC electric energy sources with transformers (not shown) etc. and for receiving the electric energy from various electric energy sources, and a limited current circuit 20 and a voltage regulator 30 and a DC/DC set-up circuit 40 coupled to the adapter or input terminal 10 respectively.

Figure 2:
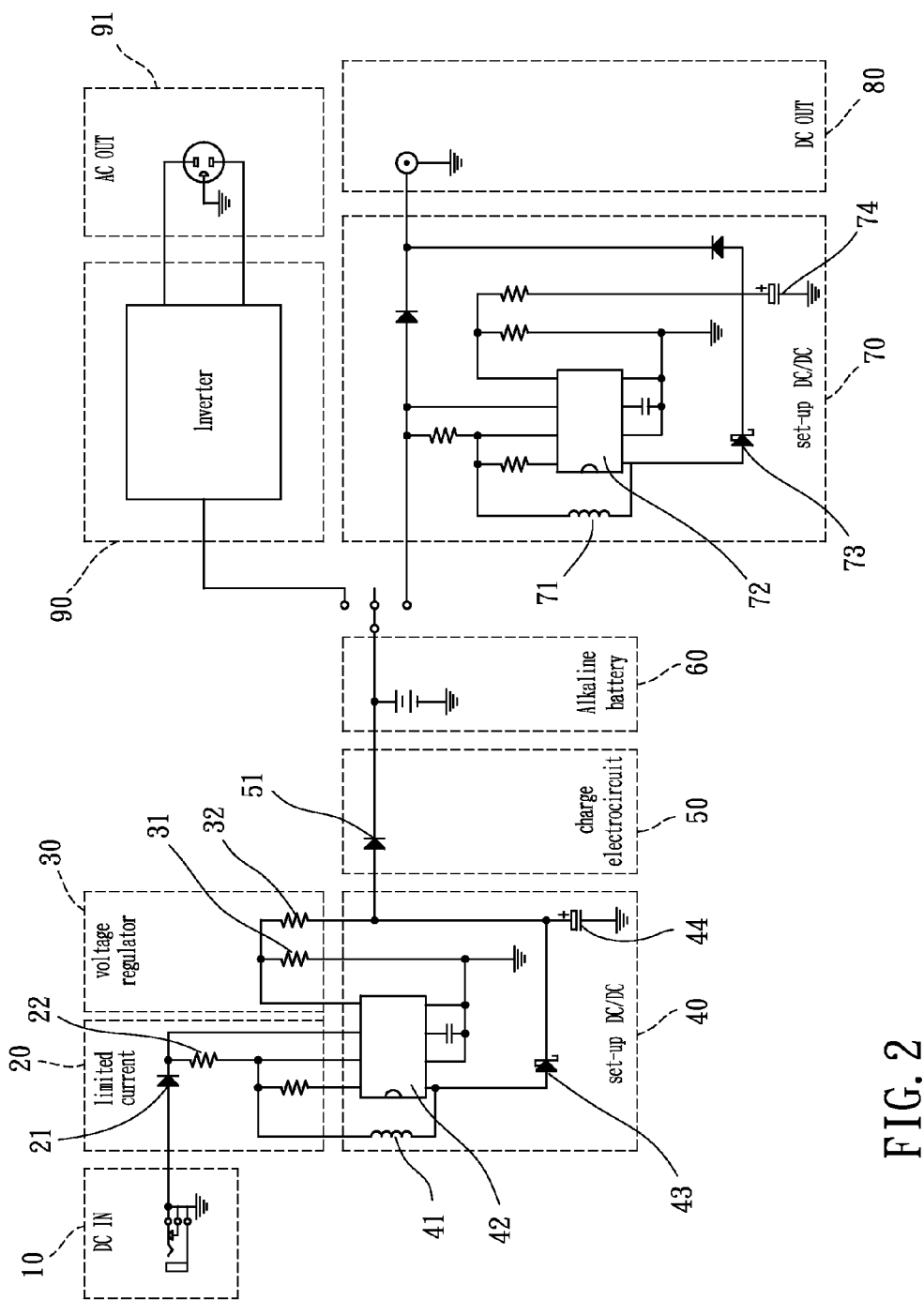
FIG. 2 is a plan schematic view illustrating the electric circuit of the portable electric energy supplying device.

As shown in FIG. 2, the set-up circuit 40 includes an inductor 41 coupled to an integrated circuit or processor device 42 for forming a resonant set-up circuit which is then rectified and/or filtered with a diode 43 and/or a capacitor 44 for generating or providing a suitable electric energy. The limited current circuit 20 includes another diode 21 and a resistor 22 coupled in series to the processor device 42, and the diode 21 also coupled to the processor device 42 directly for generating a voltage difference and for comparing with an internal reference voltage of the processor device 42 and for limiting the current flowing through the limited current circuit 20, in which the diode 21 allows the current to flow only from the limited current circuit 20 to the processor device 42 and may prevent the current from flowing backward from the processor device 42 to the limited current circuit 20.

The voltage regulator 30 includes two resistors 31, 32 coupled to the processor device 42 for stabilizing the current generated by the set-up circuit 40, the set-up circuit 40 is then coupled to a charge electrocircuit 50 which is then coupled to a battery 60, such as an alkaline battery 60 and which includes another diode 51 arranged for allowing the current to flow only from the charge electrocircuit 50 to the battery 60 in order to charge the battery 60, and for preventing the current from flowing backward from the battery 60 to the charge electrocircuit 50, and for preventing the current from being dissipated or consumed by the charge electrocircuit 50 or other circuits.

Another DC/DC set-up circuit 70 is further be provided and attached or coupled to the battery 60 for receiving the electric energy from the battery 60, and includes an inductor 71 coupled to an integrated circuit or processor device 72 for forming a resonant set-up circuit which is then rectified and/or filtered with a diode 73 and/or a capacitor 74 for generating or providing a suitable electric energy to an output device 80 which may be selected from a plug or coupler or adapter 80 for coupling to the cigarette igniter sockets of the vehicles (not shown) and for directly supplying the electric energy to charge the failed or weak or not charged battery of the vehicle in order to jump-start the vehicle. The output device 80 may also be selected from a pair of clips for directly coupling to the terminals of the failed or weak or not charged battery of the vehicle in order to jump-start the vehicle.

An inverter circuit 90 may further be provided and coupled to the battery 60 for receiving the electric energy from the battery 60 and for converting the DC electric energy to an AC electric energy that has a 110V and 60 Hz output, and the inverter circuit 90 is then coupled to a further output device 91 which may be selected from a plug or coupler or adapter 91 for coupling to the cigarette igniter sockets of the vehicles with a transformer (not shown) and for directly supplying the electric energy to charge the failed or weak or not charged battery of the vehicle, or the output device 91 may be selected from a plug or socket for supplying the electric energy to charge various kinds of electric facilities, such as the portable or mobile phones, notebooks, radios or the like.

In operation, as shown in FIGS. 1 and 2, the parts and elements or components 10-90 of portable electric energy supplying device in accordance with the present invention may be disposed or packaged in a container or receptacle, and include a plug or coupler or adapter or input terminal 10 for coupling to the cigarette igniter sockets of the vehicles for receiving the electric energy from the battery of the vehicle and for being charged or energized by the electric energy of the battery of the vehicle when the battery of the vehicle is useful, the set-up circuit 40 is then coupled to the battery 60 with the charge electrocircuit 50 which may then charge the battery 60 that may be readily available to supply the electric energy to various electric facilities.

The DC/DC set-up circuit 70 may then generate or provide a suitable electric energy to the DC output device 80, or to the AC output device 91. For example, when a vehicle has not be driven for a long time, or when the battery of the vehicle has become failed or weak or not charged, the DC output device 80 may be coupled to the cigarette igniter sockets of the vehicles for directly supplying the electric energy to charge the failed or weak or not charged battery of the vehicle in order to jump-start the vehicle. The DC output device 80 may also be directly coupled to the terminals of the failed or weak or not charged battery of the vehicle in order to jump-start the vehicle. The AC output device 91 may be coupled to the cigarette igniter sockets of the vehicles with the transformer for directly supplying the electric energy to charge the failed or weak or not charged battery of the vehicle, or the output device 91 may be used to charge various kinds of electric facilities, such as the portable or mobile phones, notebooks, radios or the like.

Accordingly, the portable electric energy supplying device in accordance with the present invention includes a structure provided for providing and supplying a direct current (DC) output to easily jump or boost the vehicle and for providing an alternative current (AC) output to energize various kinds of electric facilities.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. An electric energy supplying device comprising:
   an input terminal,
   a first set-up circuit coupled to said input terminal for receiving an electric energy from said input terminal,
   a limited current circuit and a voltage regulator coupled to said input terminal and coupled to said first set-up circuit respectively,
   a battery coupled to a charge electrocircuit and receiving the electric energy from the charge electrocircuit, said charge electrocircuit coupled to the first set-up circuit,
   a second set-up circuit coupled to said battery for receiving the electric energy from said battery, and including an output device for coupling and supplying the electric energy to a battery of a vehicle, and
   an inverter circuit coupled to said battery for receiving the electric energy from said battery, and including an output device for coupling and supplying the electric energy to charge an electric facility.

2. The electric energy supplying device as claimed in claim 1, wherein said first set-up circuit includes an inductor coupled to a processor device for forming a resonant set-up circuit, and a first diode and a capacitor for rectifying and filtering the electric energy.

3. The electric energy supplying device as claimed in claim 2, wherein said limited current circuit includes a second diode and a resistor coupled in series to said processor device, and said second diode is coupled to said processor device directly for generating a voltage difference.

4. The electric energy supplying device as claimed in claim 2, wherein said voltage regulator includes two resistors coupled to said processor device for stabilizing a current generated by said set-up circuit.

5. The electric energy supplying device as claimed in claim 1, wherein said second set-up circuit includes an inductor coupled to a processor device for forming a resonant set-up circuit, and a diode and a capacitor for rectifying and filtering the electric energy.

\* \* \* \* \*